(12) United States Patent
Tsukada et al.

(10) Patent No.: US 12,730,433 B2
(45) Date of Patent: Sep. 8, 2026

(54) PROCESS GENERATION SYSTEM

(71) Applicant: SEIKO EPSON CORPORATION, Tokyo (JP)

(72) Inventors: Ko Tsukada, Shiojiri (JP); Masafumi Tsuda, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 576 days.

(21) Appl. No.: 18/323,653

(22) Filed: May 25, 2023

(65) Prior Publication Data

US 2023/0384765 A1 Nov. 30, 2023

(30) Foreign Application Priority Data

May 26, 2022 (JP) ................................ 2022-085849

(51) Int. Cl.
*G05B 19/4155* (2006.01)

(52) U.S. Cl.
CPC .................... *G05B 19/4155* (2013.01); *G05B 2219/45244* (2013.01)

(58) Field of Classification Search
CPC .............. G05B 19/409; G05B 19/4155; G05B 2219/45244; Y02P 90/30
See application file for complete search history.

(56) References Cited

U.S. PATENT DOCUMENTS 4,823,274 A * 4/1989 Kiya .................. G05B 19/4069 700/203
5,736,080 A 4/1998 Suganuma
2003/0229599 A1* 12/2003 Sakurai .................. G06Q 10/06 700/118
2008/0065261 A1* 3/2008 Grimm .................. G05B 19/42 700/200
2011/0300397 A1 12/2011 Sugita et al.
2020/0307053 A1* 10/2020 Shimada ............... B29C 45/766
2020/0327482 A1 10/2020 Suzuki et al.
2020/0363791 A1 11/2020 Sakumiya et al.

FOREIGN PATENT DOCUMENTS

JP H08-318555 A 12/1996
JP 2004-086271 A 3/2004
JP 2010-123105 A 6/2010
JP 5604628 B2 10/2014
JP 2020-173537 A 10/2020
JP 2020-537773 A 12/2020
WO 2010-084907 A1 7/2010

* cited by examiner

*Primary Examiner* — Tameem D Siddiquee
(74) *Attorney, Agent, or Firm* — Harness, Dickey & Pierce, P.L.C.

(57) ABSTRACT

A process generation system for generating a production process of a molded product produced by an injection molding machine or a press machine is provided. The process generation system includes: a specification information acquisition unit acquiring specification information about a specification of a molded product; a processing information selection unit selecting processing information about processing of the molded product, based on the specification information; a standard routing decision unit deciding a standard routing including a plurality of processes for producing the molded product, based on the processing information; and a routing editing unit rearranging the processes included in the standard routing and thus generating the production process, based on the specification information.

5 Claims, 6 Drawing Sheets

FIG. 1

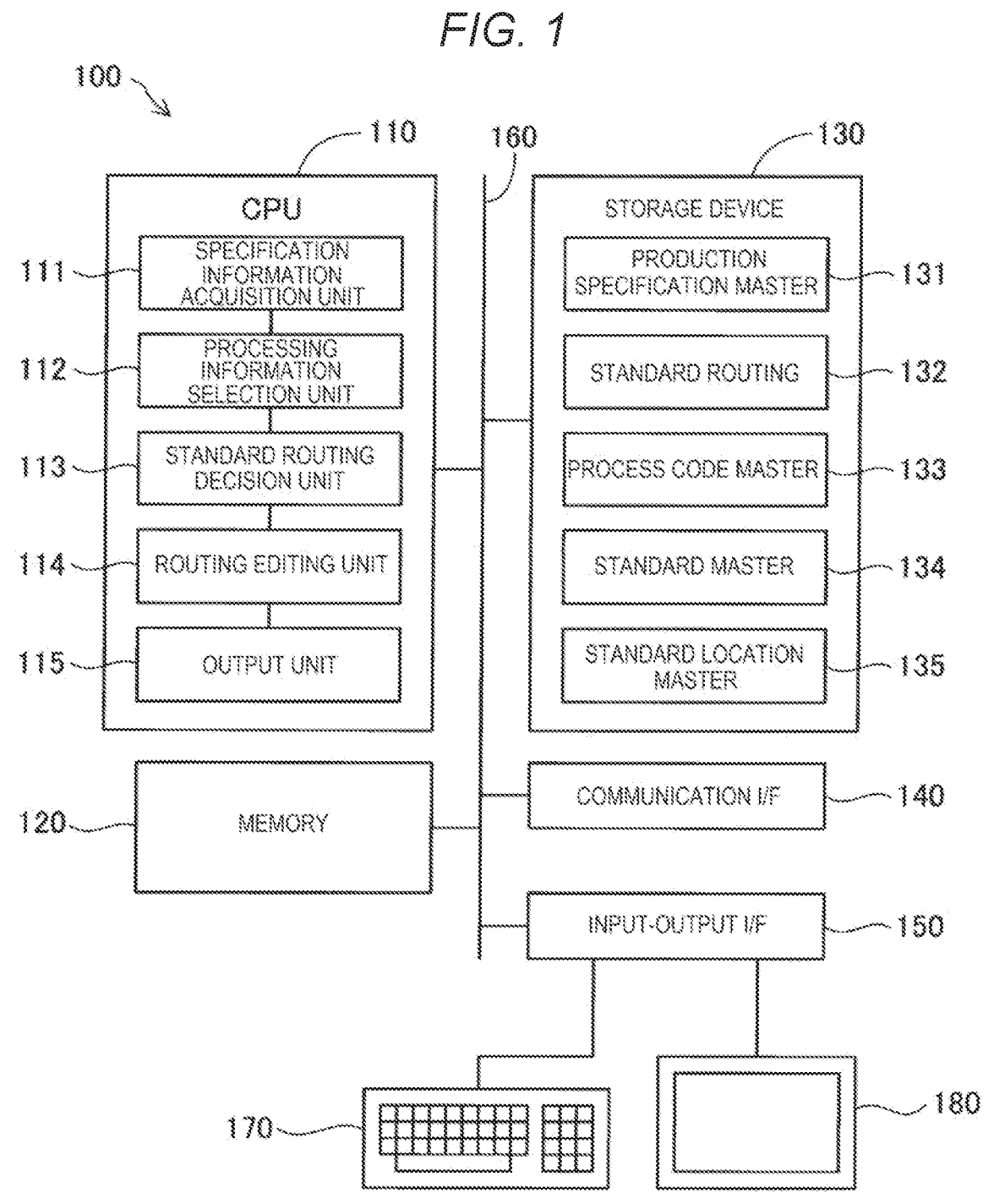

100
110
CPU
111 SPECIFICATION INFORMATION ACQUISITION UNIT
112 PROCESSING INFORMATION SELECTION UNIT
113 STANDARD ROUTING DECISION UNIT
114 ROUTING EDITING UNIT
115 OUTPUT UNIT
120 MEMORY
160
130
STORAGE DEVICE
131 PRODUCTION SPECIFICATION MASTER
132 STANDARD ROUTING
133 PROCESS CODE MASTER
134 STANDARD MASTER
135 STANDARD LOCATION MASTER
140 COMMUNICATION I/F
150 INPUT-OUTPUT I/F
170
180

FIG. 3

GEAR AL1

ITEM INFORMATION

| | COMPONENT NAME | COMPONENT CODE | NUMBER OF MOLDED PRODUCTS TO BE PRODUCED | ITEM CATEGORY | PRODUCTION METHOD CATEGORY | REQUIRED ACCURACY |
|---|---|---|---|---|---|---|
| OUTPUT | GEAR AL1 | 1008 | 500 | MOTOR | SINGLE | C |
| REVISION HISTORY | – | – | – | – | MOLDLESS | – |

FIG. 4

PRODUCTION SPECIFICATION INFORMATION

| | MATERIAL NAME | MATERIAL CODE | FACILITY SIZE | NUMBER OF MOLDED PRODUCTS | CYCLE TIME | SPECIAL SPECIFICATION | SECONDARY PROCESSING |
|---|---|---|---|---|---|---|---|
| OUTPUT | ABS | 6A12 | 200 | 1 | 8 | MOLDLESS | HEAT TREATMENT |
| REVISION HISTORY | – | – | – | – | – | – | – |

FIG. 5

PROCESS CODE MASTER DATA

| PROCESS CODE | SPECIAL PROCESS | PRODUCTION METHOD CATEGORY | PROCESS NAME | UNIT |
|---|---|---|---|---|
| DM1 | NORMAL | PREPARATION | PLAN | Setup |
| TM1 | NORMAL | SUPPLEMENTAL | MATERIAL DELIVERY | PROCESS |
| PTM1 | SPECIAL | PROCESSING | MOLDING | PROCESS |
| IS1 | NORMAL | INSPECTION | INSPECTION | PROCESS |
| BM1 | NORMAL | HUMAN-BASED WORK | PACKING | BOX |

FIG. 6

STANDARD MASTER DATA

| PROCESS CODE | NUMBER OF PRODUCTS TO BE PRODUCED | OPERATING HOURS | WORK HOURS | AMOUNT OF MATERIAL USED | DEFECTIVE RATE |
|---|---|---|---|---|---|
| DM1 | 200 | 3600 | 0 | 30000 | 0% |
| TM1 | – | – | – | – | 0% |
| PTM1 | 1 | 10 | 10 | 400 | 0.4% |
| IS1 | 1 | – | 3 | – | – |
| BM1 | 1 | 0 | 3 | – | 0% |

FIG. 7

STANDARD LOCATION MASTER DATA

| PROCESS CODE | LOCATION NAME | LOCATION CODE |
|---|---|---|
| DM1 | PLANT A | AX203 |
| TM1 | PLANT A | AX143 |
| PTM1 | PLANT A | AX203 |
| IS1 | PLANT A | AX511 |
| BM1 | WAREHOUSE A | AD101 |

PROCESS GENERATION SYSTEM

The present application is based on, and claims priority from JP Application Serial Number 2022-085849, filed May 26, 2022, the disclosure of which is hereby incorporated by reference herein in its entirety.

BACKGROUND

1. Technical Field

The present disclosure relates to a process generation system.

2. Related Art

JP-A-8-318555 discloses a technique that enables a user to rearrange a plurality of types of unit programs corresponding to a plurality of basic operations in a control device for an injection molding machine and thus freely program and design option processing such as automatic purge processing.

A production process of a molded product includes various processes such as a molding process, a process before and after the molding process, and a process performed by a worker between these processes, as well as the foregoing option processing. Therefore, a technique that can easily design the entirety of a production process of a molded product is demanded.

SUMMARY

According to an aspect of the present disclosure, a process generation system for generating a production process of a molded product produced by an injection molding machine or a press machine is provided. The process generation system includes: a specification information acquisition unit acquiring specification information about a specification of a molded product; a processing information selection unit selecting processing information about processing of the molded product, based on the specification information; a standard routing decision unit deciding a standard routing including a plurality of processes for producing the molded product, based on the processing information; and a routing editing unit rearranging the processes included in the standard routing and thus generating the production process, based on the specification information.

BRIEF DESCRIPTION OF THE DRAWINGS

FIG. 1 is an explanatory view showing a schematic configuration of a process generation system.

FIG. 3 shows an example of item information.

FIG. 4 shows an example of production specification information.

FIG. 5 shows an example of process code master data.

FIG. 6 shows an example of standard master data.

FIG. 7 shows an example of standard location master data.

DESCRIPTION OF EXEMPLARY EMBODIMENTS

A. First Embodiment

Figure 2:
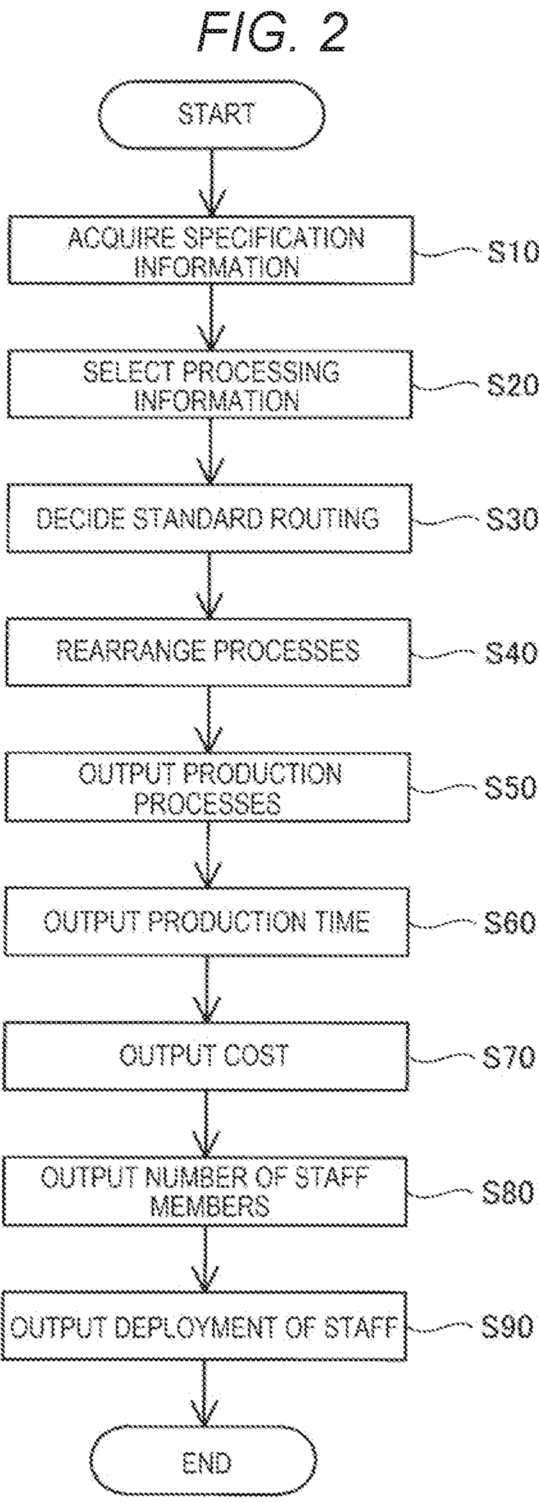
FIG. 2 is a flowchart of process generation processing.

FIG. 1 is an explanatory view showing a schematic configuration of a process generation system 100 according to a first embodiment. The process generation system 100 is a system for generating a production process of a molded product produced by an injection molding machine or a press machine. The process generation system 100 is a so-called MES (manufacturing execution system) and is used to manage the production site of a product.

The process generation system 100 is configured as a computer in which a CPU 110, a memory 120, a storage device 130, a communication interface 140, and an input-output interface 150 are coupled to each other via a bus 160. An input device 170 such as a keyboard or a mouse and a display device 180 such as a liquid crystal display are coupled to the input-output interface 150. The process generation system 100 may be connected to the internet or a local area network via the communication interface 140.

The CPU 110 reads a process generation program stored in the storage device 130 into the memory 120 and executes the process generation program, and thus functions as a specification information acquisition unit 111, a processing information selection unit 112, a standard routing decision unit 113, a routing editing unit 114, and and an output unit 115. The functions implemented by these functional units will be described in the description of process generation processing given below. A part or all of these functional units may be implemented by a circuit.

In the storage device 130, various data used by the foregoing functional units are stored. Specifically, production specification master data 131, standard routing data 132, process code master data 133, standard master data 134, and standard location master data 135 are stored in the storage device 130. Details of these data will be described in the description of the process generation processing given below.

FIG. 2 is a flowchart of the process generation processing executed by the CPU 110 of the process generation system 100. This process generation processing is processing for automatically or semiautomatically generating a production process of a molded product to be produced.

In step S10, the specification information acquisition unit 111 acquires specification information designated by the user. The specification information is information about the specification of a molded product. The specification information acquisition unit 111 may acquire, for example, the specification information stored in the storage device 130 or may acquire the specification information from another device via the communication interface 140. The specification information acquisition unit 111 may also acquire the specification information inputted by the user using the input device 170. The specification information acquisition unit 111 can display the acquired specification information on the display device 180. In this embodiment, the specification information includes item information and production specification information.

FIG. 3 shows an example of the item information. The item information includes, for example, “component name”, “component code”, “number of molded products to be produced”, “item category”, “production method category”, and “required accuracy”. The “component name” is the name of a molded product to be produced. The “component code” is identification information univocally allocated to the “component name”. The “number of molded products to be produced” is the planned number of molded products to be produced. The “item category” represents the category of a product for which the molded product is used. The “production method category” represents the molding method for the molded product. The “required accuracy” represents the processing accuracy required of the molded product. FIG. 3 shows the history of revision of the item information as "revision history".

FIG. 4 shows an example of the production specification information. The production specification information includes, for example, "material name", "material code", "facility size", "number of molded products", "cycle time", "special specification", and "secondary processing". The "material name" is the name of the material of the molded product. The "material code" is identification information univocally allocated to the "material name". The "facility size" represents the tonnage that is the processing pressure of the molding machine producing the molded product. The "number of molded products" represents the number of molded products produced in one round of processing by the molding machine. The "cycle time" represents the time required from the start of the production of one molded product to the completion of the production. The "special specification" represents the presence or absence of a special specification of the molding facility, and the type of the special specification. The "secondary processing" represents whether secondary processing of the molded product is needed or not, and the type of the secondary processing.

In step S20 in FIG. 2, the processing information selection unit 112 selects processing information, based on the specification information acquired in step S10. The processing information includes molding environment information and management category information. The molding environment information includes, for example, information about the type of the device used to manufacture the molded product, such as a clean room, a two-color molding machine, a transfer press machine, or a transfer molding machine. The management category information includes, for example, information about the inspection method for the molded product, such as full inspection, sampling inspection, or 4M inspection. The 4M inspection is an inspection of four elements in quality management, that is, "man", "machine", "material", and "method". The correspondence relationship between specification information and processing information suitable for the specification information is recorded in the production specification master data 131. The processing information selection unit 112 analyzes the specification information acquired in step S10 and automatically selects processing information suitable for implementing the specification, from the production specification master data 131. The processing information selection unit 112 can display the selected processing information along with the specification information on the display device 180. The processing information automatically selected by the processing information selection unit 112 may be edited by the user using the input device 170.

In step S30, the standard routing decision unit 113 decides a standard routing, based on the processing information. More specifically, the standard routing decision unit 113 decides a standard routing corresponding to the processing information, based on the processing information and with reference to the standard routing data 132. In the standard routing data 132, a standard order of a plurality of processes for producing the molded product is recorded as a standard routing according to the processing information. The standard routing decision unit 113 displays the decided standard routing on the display device 180. The standard routing data includes, for example, a molding process, a moldless processing process, an axis processing process, an inspection process such as an external inspection or a dimensional inspection, a packing process, a planning process, a conveyance process, and the like. The standard routing decision unit 113 expresses each process included in the decided standard routing, in the form of a process code prescribed by the process code master data 133.

FIG. 5 shows an example of the process code master data 133. In the process code master data 133, the process codes of all the processes that can be included in the standard routing are recorded. In the process code master data 133, each process code is associated with, for example, the distinction about whether it is a special process or a normal process, the category of the process, the name of the process, and the unit of the process.

In step S40 in FIG. 2, the routing editing unit 114 rearranges the processes included in the standard routing decided in step S30, based on the specification information. The rearrangement includes adding a process and deleting a process as well as changing the order. A rearrangement pattern is predetermined according to the specification information and stored in the storage device 130 in such a way that the required quality can be satisfied with respect to the required accuracy, the processing accuracy, and the degree of difficulty of molding, of the molded product.

For example, when the standard routing decided in step S30 includes a molding process, an inspection process, and a conveyance process in this order and the specification information designates a crystalline resin as the material name or the material code, the routing editing unit 114 rearranges the above order into the order of the molding process, the conveyance process, and the inspection process. When the crystalline resin is cooled and solidified, a crystal structure is generated therein. Therefore, rearranging the processes in such a way that the inspection process is carried out after the conveyance process enables a highly accurate inspection of the molded product. Also, for example, when a crystalline resin is designated as the material, the routing editing unit 114 may add an annealing process to eliminate a residual stress from the molded product, between the molding process and the conveyance process or between the conveyance process and the inspection process.

Meanwhile, for example, when the standard routing decided in step S30 includes a molding process and an extraction process in this order and the specification information prescribes the execution of two-color molding using a plurality of molding machines, the routing editing unit 114 rearranges the above order into the order of a molding process for the first color by the first molding machine, an extraction process, an attachment process to the second molding machine, a molding process for the second color, and an extraction process for the second color. Also, for example, when the specification information prescribes the execution of two-color molding using one molding machine, the routing editing unit 114 rearranges the above order into the order of the molding process for the first color, the molding process for the second color, and the extraction process.

Another example of the rearrangement of the processes may be, for example, rearranging the processes in such a way that single press processing and bending processing are carried out after laser processing, because a laser processing machine cannot be installed if bending processing is carried out first in the press molding.

In step S50, the routing editing unit 114 outputs the standard routing in which the processes are rearranged in step S40, as a series of production processes for producing the molded product, to the display device 180 and thus causes the display device 180 to display the series of production processes.

In step S60, the output unit 115 outputs information about the time of the production processes, based on the standard routing. In this embodiment, the output unit 115 outputs the time required for the production processes, referring to the standard master data 134 stored in the storage device 130.

FIG. 6 shows an example of the standard master data 134. In the standard master data 134, each process code that can be included in the standard routing is associated with a standard number of products to be produced, operating hours, a work hours, a standard amount of material used, and a standard defective rate. Of these elements, the operating hours represents the operating hours of the facility, and the work hours represents the work hours of human staff. That is, each process included in the standard routing is associated with information about the time required for the process, via the standard master data 134. The output unit 115 extracts the operating hours and the work hours for each process, referring to the standard master data 134, based on the process code of each process included in the rearranged standard routing, that is, the production processes, and thus calculates the operating hours and the work hours required for each process included in the process processes and the total of each of the operating hours and the work hours, outputs the results of the calculation to the display device 180, and causes the display device 180 to display the results of the calculation. In another embodiment, the information about the time required for each process may be directly associated with the standard routing instead of the standard master data 134.

In step S70 in FIG. 2, the output unit 115 outputs information about the cost of the production processes, based on standard routing. Specifically, the output unit 115 multiplies the operating hours of the facility and the work hours of the human staff specified in step S60 by a predetermined hourly wage of the facility and a predetermined hourly wage of the human staff, respectively, and thus calculates the cost required for the operation of the facility and the mobilization of the staff. The output unit 115 outputs the calculated cost to the display device 180 and causes the display device 180 to display the calculated cost. That is, in this embodiment, each process included in the standard routing is associated with the information about the time required for the process as the information about the cost required for the process, via the standard master data 134. In another embodiment, the information about the cost required for each process may be directly associated with the standard master data 134 or the standard routing data 132. The output unit 115 can output one or both of the cost of each process and the cost of the entire production processes calculated based on the cost of each process, as the information about the cost of the production processes. The output unit 115 may also separately output the cost of operation of the facility and the cost of mobilization of the staff or may output the total of these costs. When a plurality of types of facilities are used in each process of the production processes, an hourly wage may be set separately for each facility. The hourly wage of each facility and the hourly wage of the human staff may be prescribed in the specification information or the standard master data 134.

In step S80, the output unit 115 outputs information about the number of staff members mobilized for the production processes, based on the standard routing. Specifically, the output unit 115 divides the work hours of the human staff calculated in step S60 by the work hours of the human staff per day and thus calculates the number of staff members required for each process included in the production processes and the entire production processes. The output unit 115 outputs the calculated number of staff members to the display device 180 and causes the display device 180 to display the calculated number of staff members. That is, in this embodiment, each process included in the standard routing is associated with the information about the work hours of the human staff required for the process as the information about the number of staff members mobilized for the process, via the standard master data 134. In another embodiment, the information about the number of staff member required for each process may be directly associated with the standard master data 134 or the standard routing data 132. The output unit 115 may also calculate the number of staff member per operating day, based on the number of days of operation of the plant per month or per week or based on the work shift.

In step S90, the output unit 115 outputs information about the deployment of the staff for each process of the production processes, based on the standard routing. In this embodiment, the output unit 115 outputs the information about the deployment of the staff, referring to the standard master data 134 and the standard location master data 135 stored in the storage unit 130.

FIG. 7 shows an example of the standard location master data 135. In the standard location master data 135, each process code is associated with the name of the location where the process corresponding to the process code is carried out, and the code of the location. In the foregoing step S90, the output unit 115 specifies the location where each process included in the production processes is carried out, based on the process code of each process included in the rearranged standard routing, that is, the production processes, and with reference to the standard location master data 135. The output unit 115 outputs information associating the number of staff members required for carrying out each process of the production processes found in step S80 with the location where the process is carried out, as the information about the deployment of the staff, to the display device 180 and causes the display device 180 to display this information. The location where the process is carried out may also be, for example, a location of storage or a location of processing for the material in the plant, a location of inspection, a location of storage of products to be shipped, and the like, other than the examples shown in FIG. 7. In this way, in this embodiment, each process included in the standard routing is associated with the information about the location where the process is carried out, via the standard location master data 135. In another embodiment, the information about the location where each process is carried out may be directly associated with the standard routing data 132. Also, the information about the deployment of the staff for each process may be directly associated with the standard routing data 132.

On completion of the foregoing process generation processing, the production processes formed of a plurality of processes are displayed on the display device 180 and the information about the production time, the cost, the number of staff members, and the deployment of the staff is displayed as well.

In the process generation system 100 according to the embodiment described above, as the user designates the specification information about the specification of the molded product, the selection of the processing information, the decision of the standard routing, and the rearrangement of the processes included in the standard routing are performed and production processes are generated automatically or semiautomatically. Therefore, the user can easily design the entire production processes of the molded product.

In the process generation system 100 according to the embodiment, the production time and the cost of the molded product, the number of staff members required for the production, and the deployment of the staff are outputted in addition to the production processes. Therefore, the user can easily manage these pieces of information, that is, the production time and the cost, the number of staff members, and the deployment of the staff. Thus, for example, the cost of production can be accurately calculated. Also, since the information about the production time and the location where the work is carried out is acquired, it becomes easier to predict the load at each location in the plant. Therefore, a work plan corresponding to the load status can be easily prepared and a reduction in the fixed costs can thus be achieved.

B. Other Embodiments (1) In the above embodiment, a part or all of steps S60 to S90 in the process generation processing shown in FIG. 2 may be omitted. When all of these steps are omitted, the process generation system 100 may not have the output unit 115.

(2) In the above embodiment, the display device 180 displays the information about the production processes, the production time, the cost, the number of staff members, and the deployment of the staff. However, the process generation system 100 may output these pieces of information to another device that can communicate via the communication interface 140, or may output these pieces of information to a print medium, using a printing device.

C. Other Aspects

The present disclosure is not limited to the foregoing embodiments and can be implemented with various configurations without departing from the spirit and scope of the present disclosure. For example, a technical feature in the embodiments corresponding to a technical feature in the aspects described below can be replaced or combined with another where appropriate, in order to solve a part or all of the foregoing problems or in order to achieve a part or all of the foregoing effects. The technical feature can be deleted where appropriate, unless described as essential in this specification.

(1) According to an aspect of the present disclosure, a process generation system for generating a production process of a molded product produced by an injection molding machine or a press machine is provided. The process generation system includes: a specification information acquisition unit acquiring specification information about a specification of a molded product; a processing information selection unit selecting processing information about processing of the molded product, based on the specification information; a standard routing decision unit deciding a standard routing including a plurality of processes for producing the molded product, based on the processing information; and a routing editing unit rearranging the processes included in the standard routing and thus generating the production process, based on the specification information.

In the process generation system according to this aspect, the specification information about the specification of the molded product is acquired. Thus, the selection of the processing information, the decision of the standard routing, and the rearrangement of the processes included in the standard routing are carried out and the production process is produced. Therefore, the entire production process of the molded product can be easily designed.

(2) In the above aspect, each process included in the standard routing may be associated with information about a time required for the process. The process generation system may include an output unit outputting information about a time of the production process, based on the standard routing. According to such an aspect, the time of the production process can be easily managed.

(3) In the above aspect, each process included in the standard routing may be associated with information about a cost required for the process. The process generation system may include an output unit outputting information about a cost of the production process, based on the standard routing. According to such an aspect, the cost required for the production of the molded product can be easily managed.

(4) In the above aspect, each process included in the standard routing may be associated with information about a number of staff members required for the process. The process generation system may include an output unit outputting information about a number of staff members mobilized for the production process, based on the standard routing. According to such an aspect, the number of staff members mobilized for the production of the molded product can be easily managed.

(5) In the above aspect, each process included in the standard routing may be further associated with information about a location where the process is carried out. The process generation system may include an output unit outputting information about a deployment of staff for each process in the production process, based on the standard routing. According to such an aspect, the deployment of staff for molding the molded product can be easily managed.

The present disclosure can also be implemented, for example, as a process generation method, a computer program for generating a process, a recording medium in which the computer program is recorded in a computer-readable manner, or the like, other than the foregoing aspects of the process generation system.

What is claimed is:

1. A process generation system for generating a production process of a molded product produced by an injection molding machine or a press machine, the process generation system comprising:

a memory configured to store a program; and a processor configured to execute the program so as to:

acquire specification information about a specification of the molded product, the specification information including:

item information relating to the production process and including a component name, a component code, a number of the molded product to be produced, an item category, a production method category, and a required accuracy; and production specification information relating to the production process and including a material name, a material code, a facility size, a cycle time, a special specification, and a secondary processing;

select processing information about processing of the molded product, based on the specification information, the processing information including:

molding environment information relating to the production process and including a type of a device to manufacture the molded product; and management category information relating to the production process and including an inspection method for the molded product;

decide a standard routing including a plurality of processes for producing the molded product based on the processing information; and rearrange the plurality of processes included in the standard routing and generate the production process based on the specification information, the required accuracy, a processing accuracy, and a degree of difficulty of molding with respect to the molded product, wherein the rearrangement includes:

rearranging the plurality of processes;

adding another process into the plurality of processes; and deleting a process from the plurality of processes.

2. The process generation system according to claim 1, wherein each process of the plurality of processes included in the standard routing is associated with information about a time required for the each process, and the process generation system further includes an output unit outputting the information about the time of the production process based on the standard routing.

3. The process generation system according to claim 1, wherein each process of the plurality of processes included in the standard routing is associated with information about a cost required for the each process, and the process generation system further includes an output unit outputting the information about the cost of the production process based on the standard routing.

4. The process generation system according to claim 1, wherein each process of the plurality of processes included in the standard routing is associated with information about a number of staff members required for the each process, and the process generation system further includes an output unit outputting the information about the number of staff members required for the production process based on the standard routing.

5. The process generation system according to claim 4, wherein the each process included in the standard routing is further associated with information about a location where the each process is carried out, and the process generation system further includes the output unit outputting information about a deployment of staff members for the each process at the location in the production process based on the standard routing.

* * * * *